United States Patent
Singh et al.

(10) Patent No.: US 11,561,701 B2
(45) Date of Patent: Jan. 24, 2023

(54) SYSTEM AND METHOD FOR SURVIVAL FORECASTING OF DISK DRIVES USING SEMI-PARAMETRIC TRANSFER LEARNING

(71) Applicant: EMC IP Holding Company LLC, Hopkinton, MA (US)

(72) Inventors: Jitendra Singh, Bangalore (IN); Rahul Deo Vishwakarma, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 127 days.

(21) Appl. No.: 16/893,102

(22) Filed: Jun. 4, 2020

(65) Prior Publication Data
US 2021/0382631 A1 Dec. 9, 2021

(51) Int. Cl.
| | |
|---|---|
| *G06F 3/06* | (2006.01) |
| *G06N 20/00* | (2019.01) |
| *G06F 11/14* | (2006.01) |
| *G06F 21/62* | (2013.01) |
| *G06K 9/62* | (2022.01) |

(52) U.S. Cl.
CPC ............ *G06F 3/0619* (2013.01); *G06F 3/067* (2013.01); *G06F 3/0653* (2013.01); *G06F 3/0659* (2013.01); *G06F 3/0689* (2013.01); *G06F 11/1451* (2013.01); *G06F 11/1464* (2013.01); *G06F 11/1469* (2013.01); *G06F 21/6209* (2013.01); *G06K 9/6256* (2013.01); *G06N 20/00* (2019.01)

(58) Field of Classification Search
CPC .... G06F 3/0619; G06F 3/0653; G06F 3/0659; G06F 3/067; G06F 3/0689; G06F 11/1451; G06F 11/1464; G06F 11/1469; G06F 21/6209; G06N 20/00; G06K 9/6256

See application file for complete search history.

(56) References Cited

U.S. PATENT DOCUMENTS

| | | | |
|---|---|---|---|
| 7,149,659 B1 * | 12/2006 | Lesmerises | G06F 11/008 702/185 |
| 2016/0239210 A1 * | 8/2016 | Patocka | G06F 3/065 |
| 2017/0192957 A1 * | 7/2017 | Ide | G06F 40/151 |
| 2020/0004435 A1 * | 1/2020 | Borlick | G06F 3/0653 |

(Continued)

OTHER PUBLICATIONS

"Predicting HDD Failures from Compound SMART Attributes", Shiri Gaber et al., Systor '17 Haifa, Israel. http://dx.doi.org/10.1145/3078469.3081875.

(Continued)

*Primary Examiner* — Eric Cardwell
(74) *Attorney, Agent, or Firm* — Staniford Tomita LLP

(57) ABSTRACT

Embodiments are directed to a method and system of forecasting a disk drive survival period in a data storage network, by obtaining operating system data and manufacturer data for the disk drive to create a dataset, screening the dataset to identify a number of features to be selected for model creation, wherein the data set includes censored data and non-censored data, and performing, in an analytics engine, semi-parametric survival analysis on the data set using transfer learning on the model to provide a time-based failure prediction of the disk drive. A graphical user interface provides to a user the failure prediction in one of text form or graphical form.

20 Claims, 11 Drawing Sheets

(56) References Cited

U.S. PATENT DOCUMENTS

2021/0042590 A1* 2/2021 Watts .................. G06N 3/08
2021/0241141 A1* 8/2021 Dugger ................ G06N 5/04

OTHER PUBLICATIONS

"RAIDShield: Characterizing, Monitoring, and Proactively Protecting Against Disk Failures", Ao Ma et al., ACM Transactions on Storage, vol. 11, No. 4, Article 17, Nov. 2015. http://dx.doi.org/10.1145/2820615.

"Proactive Error Prediction to Improve Storage System Reliability", Farzaneh Mahdisoltani et al. Proceedings of the 2017 USENIX Annual Technical Conference (USENIX ATC '17). Jul. 12, 2017. https://www.usenix.org/system/files/conference/atc17/atc17-mahdisoltani.pdf.

* cited by examiner

300

| CODE | NAME |
|------|------|
| 0h | NO SENSE |
| 1h | RECOVERED ERROR |
| 2h | NOT READY |
| 3h | MEDIUM ERROR |
| 4h | HARDWARE ERROR |
| 5h | ILLEGAL REQUEST |
| 6h | UNIT ATTENTION |
| 7h | DATA PROTECT |
| 8h | BLANK CHECK |
| 9h | VENDOR SPECIFIC |
| Ah | COPY ABORTED |
| Bh | ABORTED COMMAND |
| Dh | VOLUME OVERFLOW |
| Eh | MISCOMPARE |
| Fh | COMPLETED |

|  | F01 | F02 | F03 | F04 | F06 | F07 | F08 | ... | Fn | Surv. Time | Censor Ind. |
|---|---|---|---|---|---|---|---|---|---|---|---|
| instance 01 | -1.34 | -0.74 | 1.33 | -0.36 | 0.73 | -0.41 | -0.72 | ... | 0.30 | 47 | 1 |
| instance 02 | -0.52 | -0.76 | -1.29 | -1.22 | 0.08 | -0.06 | -0.14 | ... | 0.42 | 30 | 1 |
| instance 03 | -1.40 | -0.54 | -0.29 | 0.39 | 0.66 | -1.25 | -0.92 | ... | -1.01 | 8 | 1 |
| instance 04 | 3.27 | 0.34 | 0.87 | -2.19 | -1.49 | -1.35 | -0.50 | ... | -0.17 | 22 | 1 |
| instance 05 | -0.09 | -0.84 | 0.33 | -0.63 | 0.80 | 0.77 | -0.51 | ... | 0.95 | 18 | 0 |
| ... | ... | ... | ... | ... | ... | ... | ... | ... | ... | ... | ... |
| instance n | -0.44 | 0.17 | -0.95 | -0.02 | -0.41 | -0.42 | 0.64 | ... | -0.16 | 15 | 0 |

702 — Surv. Time
704 — Censor Ind.

FIG. 7

SYSTEM AND METHOD FOR SURVIVAL FORECASTING OF DISK DRIVES USING SEMI-PARAMETRIC TRANSFER LEARNING

TECHNICAL FIELD

Embodiments are generally directed to data storage systems, and more specifically to forecasting disk drive survival periods using semi-parametric transfer learning.

BACKGROUND

Modern data storage systems frequently employ hundreds or even thousands of HDDs (Hard-Disk Drives) interconnected by high-speed busses, such as Serial Attached SCSI (SAS) busses. In large-scale data backup environments, such HDDs can be organized as storage networks, such as Storage Area Networks (SAN). The disk drives may be provided as part of virtualized networks as well, comprising large numbers of virtual machines (VMs), which utilize shared HDD resources. Disk drives are often grouped together into RAID (Redundant Array of Inexpensive Disks) configurations to improve reliability and performance by spreading data across multiple disks.

In active data storage networks, disks are in constant use and at least some are bound to fail over their operational lifetimes. Failure of disk drives can cause not only data unavailability, but also permanent data loss that can severely impact business and operations. Early detection of potential drive failures is thus an important task for system administrators. Certain studies have shown that mechanical failures account for about 60% of all drive failures, and that most mechanical failures result from gradual wear, which provide indicators that failure is imminent. These may include increased heat output, increased noise levels, problems with reading and writing of data, or an increase in the number of damaged disk sectors. This has led to the development of monitoring systems and methods to detect and report various indicators of drive reliability to help predict imminent disk drive hardware failures. One such system is the SMART (Self-Monitoring, Analysis and Reporting Technology) system, which is included in most modern HDDs, solid state drives (SSDs), and eMMC drives. A SMART system monitors the internal information of a drive by keeping track of a series of variables that are considered the most likely indicators of reliability, such as raw read error rate, spin-up time, reported uncorrectable errors, power-on time, load cycle count, and so on. When the data indicates a possible imminent drive failure, software running on the host system may provide user notification so that preventive action can be taken to replace or route around a failing drive to avoid data loss.

One present issue with parameter-based analysis systems, such as SMART, is that as technology advances, disk drive manufactures continually develop their own ways of assigning values for SMART parameters. This introduces heterogeneity when different disk drives are combined and makes difficult the creation of a uniform disk failure prediction model. To overcome this issue, certain artificial intelligence (AI) or machine learning (ML) methods have been developed. Most present methods, however, use threshold (i.e., fail/survive) parameters and/or batch model based machine learning. These systems also do not handle censored data, which is a major concern when dealing with a time-to-event problem, such as posed by the eventual failure of a disk drive.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC and Data Domain are trademarks of EMC Corporation of Hopkinton, Mass.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 3 is a table that lists certain sense codes that can be used for the operating system data, under some embodiments.

FIG. 7 is a table that illustrates an example survival time data set, under certain embodiments.

DETAILED DESCRIPTION

Figure 1:
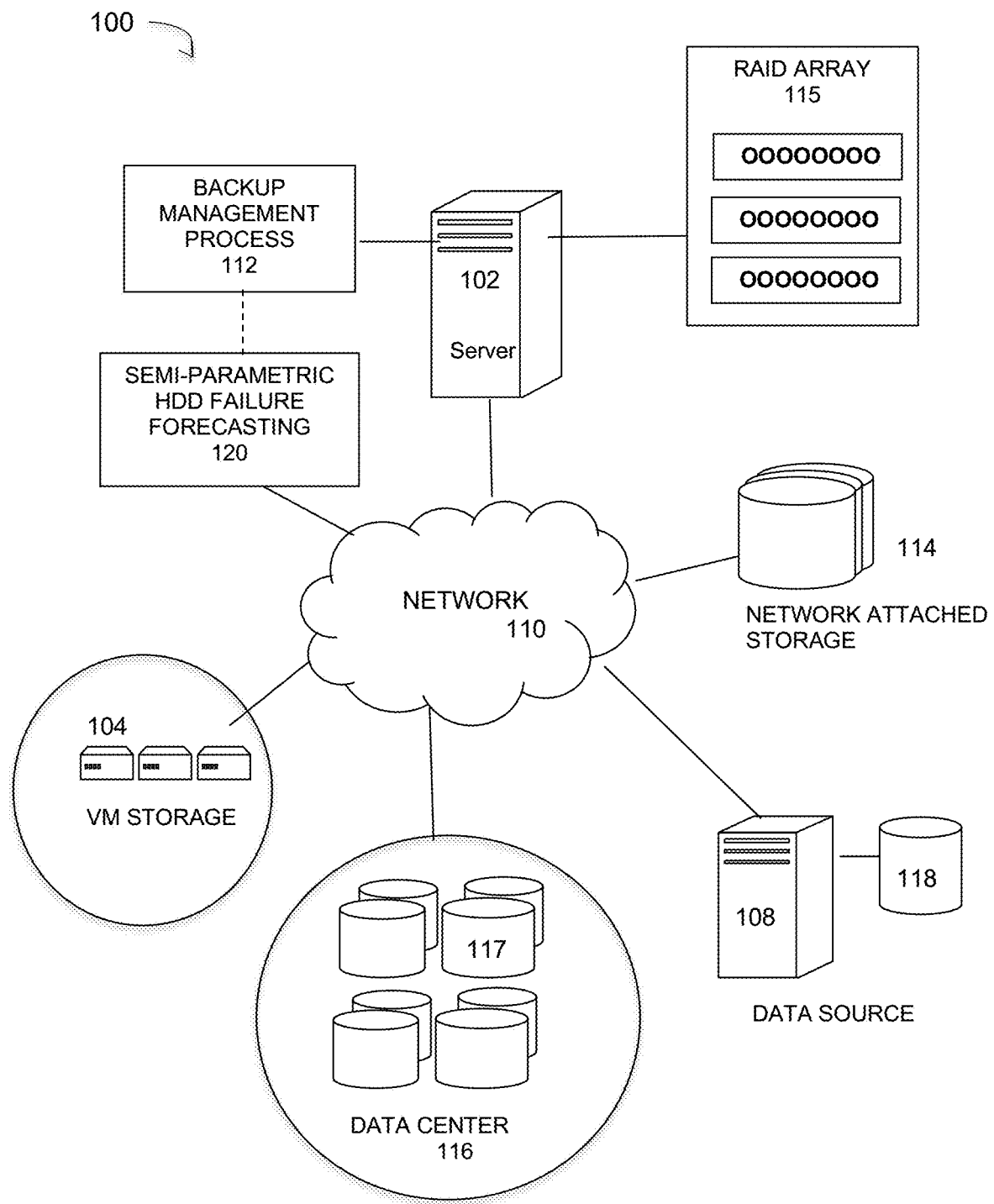
FIG. 1 illustrates a data storage system that implements one or more embodiments of a disk drive failure forecasting process using semi-parametric transfer learning, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup related processes executed in a network storage system, such as a storage area network, wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to a system and method of implementing a disk drive screening mechanism to efficiently identify the number of features (high dimensional dataset) to be selected for model creation and that efficiently handles censored (e.g., right-censored) datasets. Embodiments further include a system and method that uses a hybrid approach to selected variables from SMART parameters and operating system (OS) parameters, and that uses transfer learning for time-to-event prediction using semi-parametric survival analysis.

FIG. 1 illustrates a data storage system 100 that implements one or more embodiments of a disk drive failure forecasting process using semi-parametric transfer learning, under some embodiments. In system 100, a backup or storage server 102 executes a backup management process 112 that coordinates or manages the backup of data from one or more data sources (e.g., clients to the storage devices. The storage devices may serve as network storage devices or target storage devices for data backed up in large-scale data backup operations. In an embodiment, the server 102 may be coupled to an array or arrays of disks or memory devices and may be arranged in the form of multi-memory shelves, such as in enterprise or large-scale data storage facilities. This is illustrated in system 100 as RAID array 115, which shows a number of HDD or SSD shelves that each comprise a number of individual disks. Any practical number and arrangement of SSD, HDD, and respective shelves may be provided, and aspects of the I/O scheduling process may be scaled to work with single storage devices, medium size arrays, or large-scale mixed media arrays. As an example, a present embodiment may control a RAID array comprising 56 shelves with 15 four-Terabyte (4 TB) drives, though any other configuration is possible.

Other target drives may include network attached storage (NAS) array 114 which is coupled to server 102 through network 110 or a Fibre Channel (FC) link, Virtual Machine (VM) storage 104, or local client storage. Disk drives 117 may also form parts of one or more data centers 116. Depending on the scale of network 100, any number of disk drives (e.g., HDD or SDD devices) may be used for storage of the data generated or sourced by the system. The storage server 102 executes a backup process 112 that causes or facilitates the backup of the application data the storage devices of the network, which may at least be partially implemented through RAID components of array 115 or any of the disk drives in the system. The storage server 108 may implement certain backup processes such as deduplication processes. In an embodiment the storage server is embodied as a data domain replicator (DDR) device provided by EMC Corporation of Hopkinton, Mass.

Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application; and the network may include one or more virtual machines (VMs) 104 with each VM representing virtual clients that may be supported by one or more servers within each VM, or other type of centralized network server.

As shown in the example system of FIG. 1, a large number of disk drives may comprise part of the storage resources of the network 100 and may be provided in the form of magnetic HDDs or solid state drives. In general, drives in a RAID array or other disk array (e.g., data center 116 or NAS 114 are installed at a certain time and have a certain expected operational lifespan. Disk drives may be replaced or upgraded according to a set schedule in advance of their specified end of life. During normal operation, however, it is expected that some drives may experience a hardware failure prior to their expected end of life. Embodiments include a semi-parametric HDD failure forecasting process 120 that helps forecast a survival measure of each disk to allow system administrators to identify potentially problematic disks and remove them prior to failure. The method 120 implements a disk drive screening mechanism to efficiently identify the number of features (high dimensional dataset) to be selected for model creation and that efficiently handles censored (e.g., right-censored) datasets. It also uses a hybrid approach to selected variables from SMART parameters and operating system parameters, and a method that uses transfer learning for time-to-event prediction using semi-parametric survival analysis. The process or component 120 may be implemented as a network 110 or cloud-based process, or it may be implemented as a process provided as part of the backup management process 112 or other process executed by server 102.

In an embodiment, process 120 uses censored data (i.e., right censored) for disk drive failure forecasting. In general, a normally distributed variable can have values without limits in both directions on the scale, thus effectively having infinite tails with no real boundary. In contrast, censored data is data that has unknown values beyond a bound on either or both ends of the scale. When the data is observed and reported at the boundary, the range of the scale can be restricted. In left censoring a data point is below a certain value by an unknown amount, and in right censoring, a data point is above a certain value by an unknown amount. In the field of reliability analysis there is usually not an exact failure time for all devices, and before the end of an analysis period not all devices will have failed. The time data for devices that have not yet failed are right censored.

Figure 2:
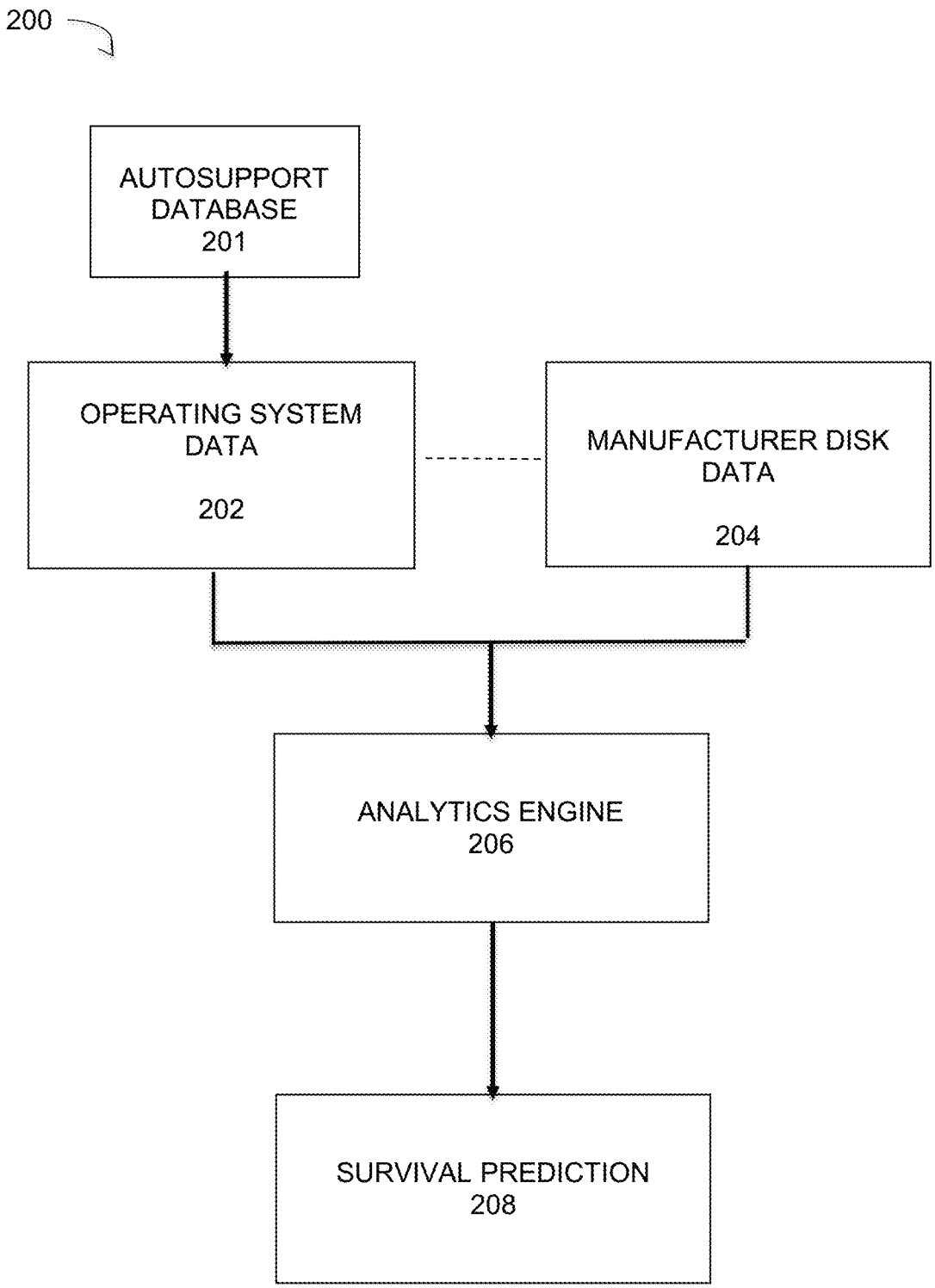
FIG. 2 illustrates functional components of a disk drive failure forecasting process using semi-parametric transfer learning, under some embodiments.

FIG. 2 illustrates functional components of a disk drive failure forecasting process using semi-parametric transfer learning, under some embodiments. In an embodiment, a data analytics engine 206 receives data about a plurality of disk drives to generate a survival prediction 208 of the drives. For the embodiment of system 200, two different data sets are used. The first is a set of operating system parameters comprising SCSI sense keys, or similar interface connection sensing signals or auto support data. For example, in Linux system, these are SCSI return codes found in the /var/log/messages system directory. Other operating systems may use similar codes and storage locations.

FIG. 3 is a table that lists certain sense codes that can be used for the operating system data, under some embodiments. In an embodiment, the data stored in table 300 comprises an auto support (ASUP) database table that is populated by the operating system. For example, a Data Domain system has a mechanism to collect system information (e.g. Data Domain operating system logs, HDD logs, etc.) which is internally named "autosupport bundle." At first, this resides on the Data Domain system, but at frequent intervals (set by the user) this information is sent to the vendor or company via e-mail (or other messaging) triggered from Data Domain. The vendor then stores this information in a database for analysis of each customer Data Domain system health. At any particular point in time (or at specific interval), the system checks to see whether it received any of SCSI senses code in the /var/log/messages directory. As shown, example codes include certain status, error, data processing, command processing, and other similar status signals. The table of FIG. 3 is provided as an example only, and any similar or appropriate system used by the operating system to indicate the status of a disk drive with respect to system operating and processing status can be used, such as those generated by diagnostic programs, system admin support, and so on.

As shown in FIG. 2, the operating system data 202 may be provided in part from an auto support (ASUP) database 201 that lists various disk manufacturers and operating statistics, such as in the form of failure rates or percentages over a period of use for a statistically significant number of drives per manufacturer.

Figure 4:
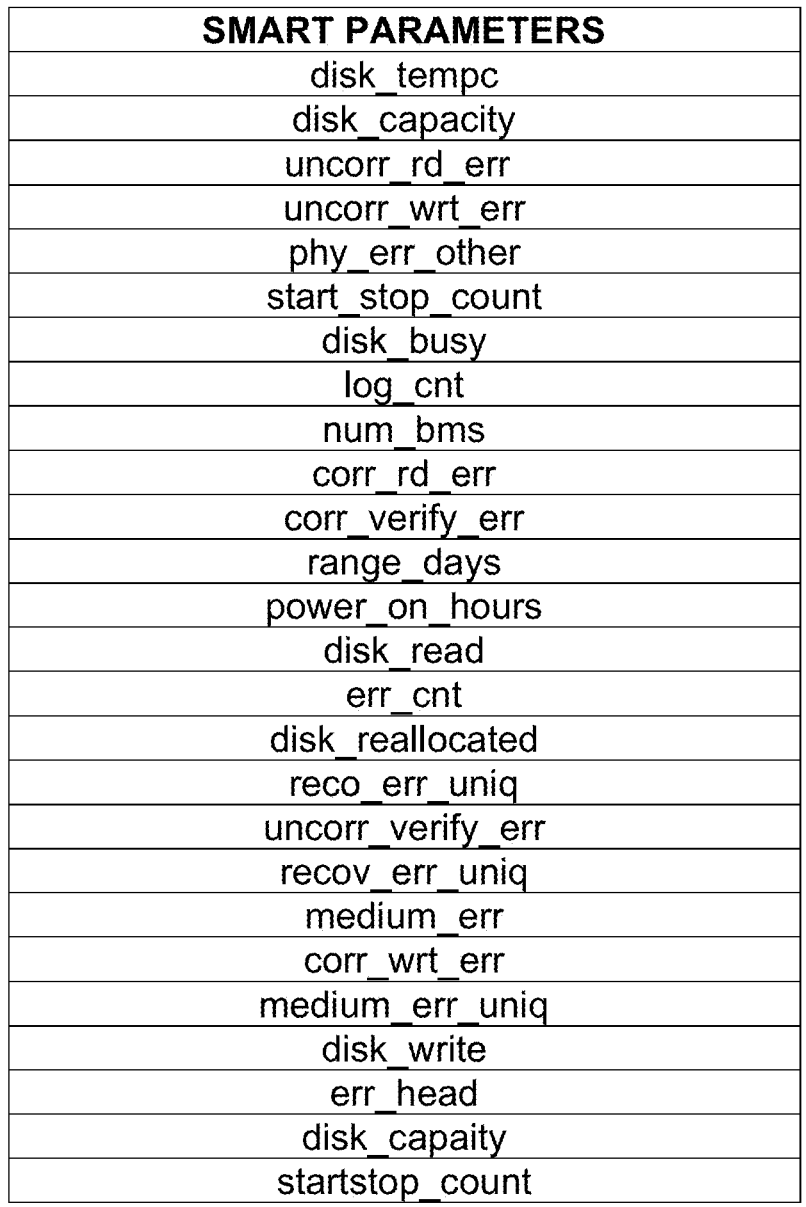
FIG. 4 is a table that lists certain SMART parameters that can be used for the disk drive data, under some embodiments.

The second data set of FIG. 2 comprises the manufacturer disk drive data. In an embodiment, this comprises SMART data. In present systems, SMART data comprises many data variables (e.g., over 70 variables), but is not necessarily standardized over different software and hardware standards, nor used consistently by all disk drive manufacturers. FIG. 4 is a table that lists certain SMART parameters that can be used for the disk drive data, under some embodiments. In an embodiment, these are generated, stored, and accessed according to the standard SMART data access protocols provided for each disk drive model or manufacturer. The table of FIG. 4 is provided as an example only, and any similar or appropriate SMART data or other type of disk drive diagnostic data may be used.

In an embodiment, the analytics engine uses the complete dataset from 202 and 204 to create a model that has a combination of uncensored (dataset whose values are known and available) and censored data. The use of censored data is one of the most crucial tasks in survival analysis and contributes to the total number at risk up to the time that they ceased to be followed. Certain scenarios are used as the source of (right) censored data for disk drives. These include: disk drives that do not experience the time-to-event (failure) as predicted from the failure model (i.e., few drives do not fail at similar age); drives for which SMART and OS parameters values for specific disk drives are not provided because of network issue or system misconfiguration; and drives that are manually swapped or replaced from one system to another system.

Figure 5:
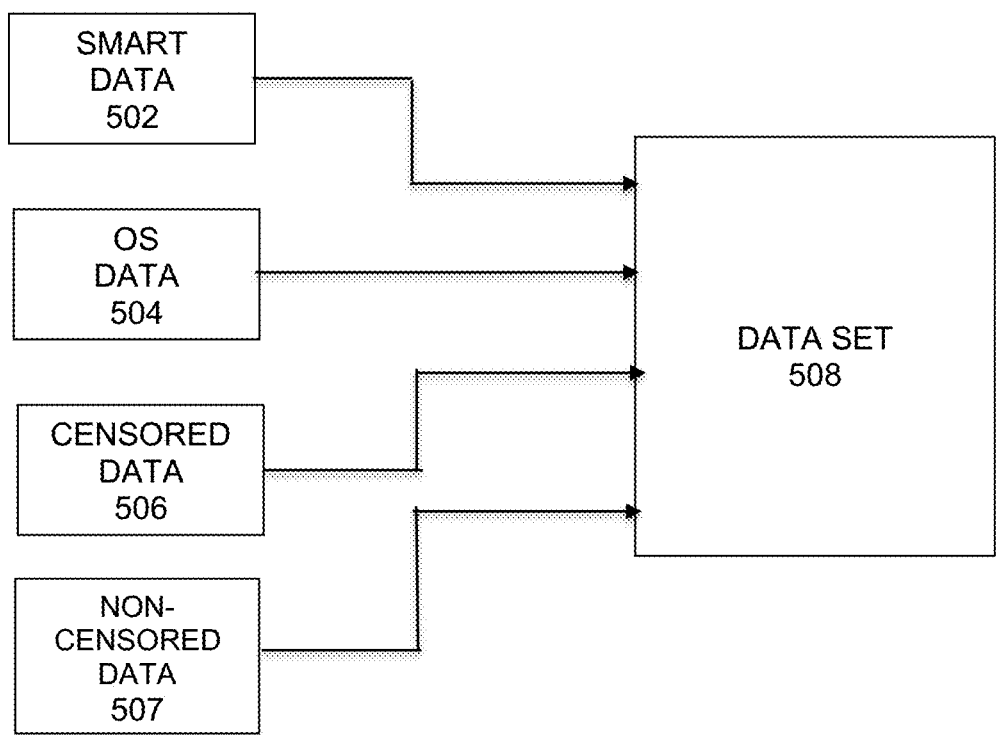
FIG. 5 illustrates the formulation of a disk failure data set for use by an analytics engine, under some embodiments.

As shown in FIG. 2, system 200 uses a hybrid approach based on a selection of parameters (e.g., 61 parameters, or similar) from the auto support database. These comprise the SMART data (Table 400) 204 and the SCSI return error values (Table 300) 202. These data sets along with censored data are used to create the final data set used by the analytic engine. FIG. 5 illustrates the formulation of a disk failure data set for use by an analytics engine, under some embodiments. As shown in FIG. 5, the final data set 508 is built up using the SMART data 502, operating system data 504 as well as non-censored 507 and censored data 506.

Figure 6:
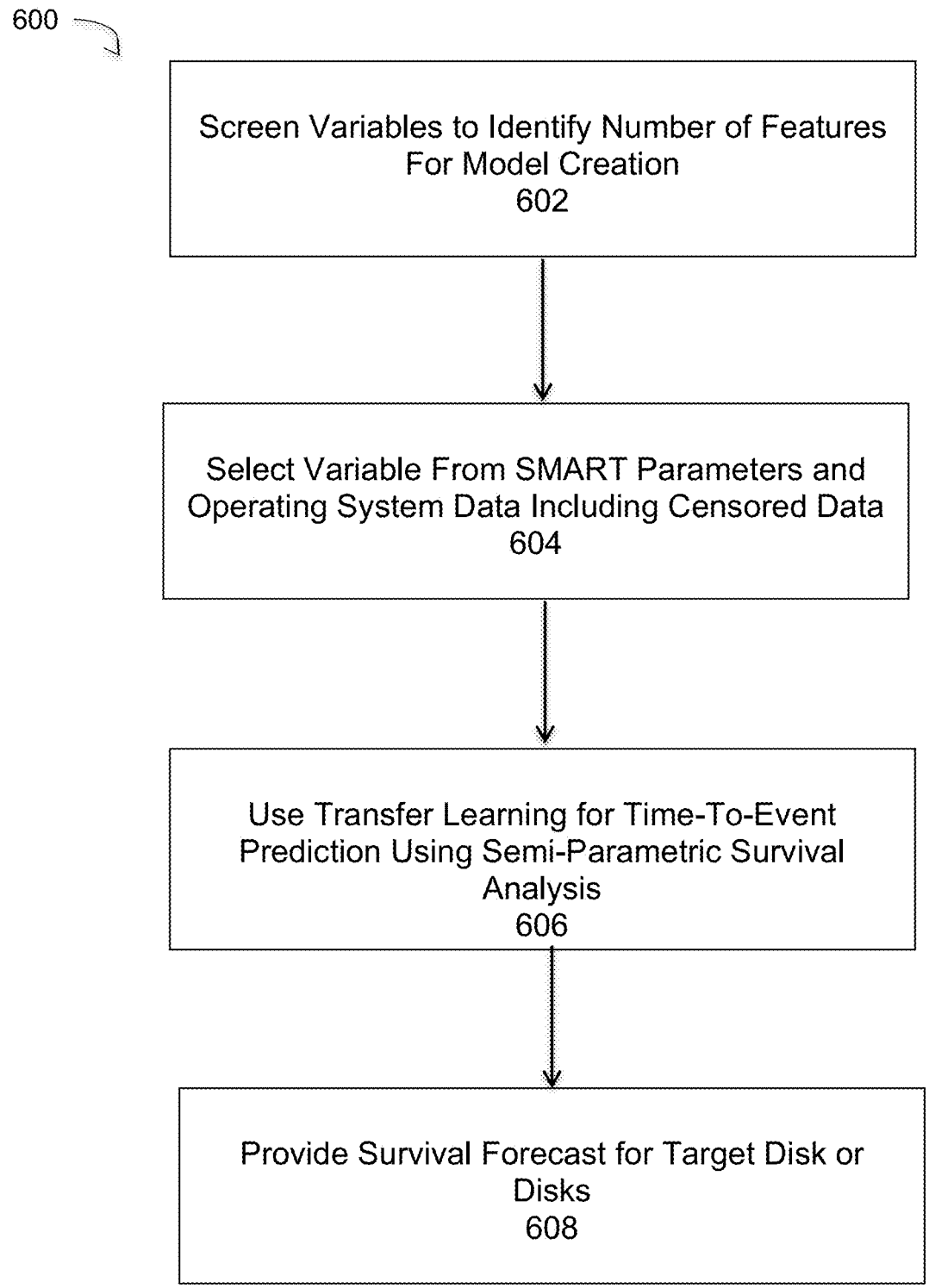
FIG. 6 is a flowchart that illustrates an overall process of a disk drive failure detection process, under some embodiments.

FIG. 6 is a flowchart that illustrates an overall process of a disk drive failure detection process and as performed by the system of FIG. 2, under some embodiments. In this process 600, the method starts by implementing a screening mechanism to efficiently identify the number of features (high dimensional dataset) to be selected for model creation, 602. It uses a hybrid approach to selected variables from SMART parameters and operating system parameters (as shown in FIG. 5), 604. In step 606, process 600 uses transfer learning for time-to-event prediction using semi-parametric survival analysis, and then provides a survival forecast for certain target disks, 608. The method of FIG. 6 efficiently handles censored (right) dataset and uncensored datasets to incorporate both the SMART and operating system data.

Survival analysis generally involves modeling the time to a first event (e.g., death or failure). In general, there are three options for modeling a survival function: non-parametric, semi-parametric, and parametric. Embodiments utilize Cox regression, which is a well-known semi-parametric technique. Cox regression decomposes the hazard as instantaneous risk into a non-parametric (shared across all observations) risk, and a relative risk, which describes how individual covariates (parametric) affect risk.

In an embodiment, the input parameters and data snapshots for certain AI or ML processes are as follows: (1) training dataset in the source domain, (2) training dataset in the target domain, and (3) testing dataset in the target domain.

FIG. 7 is a table that illustrates an example survival time data set, under certain embodiments. For table 700 of FIG. 7, F01 to Fn columns are the feature obtained from the screening process. The Survival Time column 702 is the time from when the disk was powered ON, and the Censor Indicator column 704 denotes the status of a disk, where the binary value 0 indicates the disk is in a failed state, and binary value 1 indicates that the disk is in a normal state.

As shown in FIG. 6, process 600 screens variables to identify the number of features for creating the model to be used by the analytics engine 206. The screening step helps to efficiently identify the number of features in any model. For example, if there are 90 features in an existing dataset (e.g., 508), then applying screening will identify only the most important features from those 90 features, and return only these important features (e.g., 60 features) instead. The removal of extra features in a dataset can dramatically reduce the dimensionality of the feature space and consequently lower the run time and compute time of model. Once the unimportant features are screened from the existing features in a dataset, then only the important features are fed to the model for analysis and transfer learning. The screening process identifies features whose corresponding coefficients are highly likely or guaranteed to be zero, and thus can be safely screened from the analysis process.

As shown in FIG. 5, the dataset 508 also consists of censored data 506 and uncensored data 507, and both are used for modeling. The censored data are those data points for disk drives which are removed form observation before the actual failure, and the uncensored data points are disk data points that are kept in observation till its end of a disk's life.

Analytics Processing

In an embodiment, the analytics process applies certain artificial intelligence or machine learning (AWL) techniques using the model based on the screened variables. A Cox model is used to explore the relationship between the disk survival rate and several explanatory variables. As is known, a Cox model provides an estimate of the hazard or risk of an event given certain diagnostic variables. In the case of disk drives, this would be the risk of disk failure given the screened operating system and SMART data variables. Although embodiments are described with respect to the Cox model, it should be noted that other statistical models can also be used. For example, alternative transfer processes can use Neural Network (or Deep Learning) based machine learning techniques.

Usually, in the learning process, the model must be trained based on a series of values for lambda ($\lambda$), and the best $\lambda$ is selected via cross-validation. In general, lambda is a series of values, which are used to train the model of Cox Transfer. The value of lambda is calculated via cross validation. In an embodiment, system 200 employs the warm-start approach to build the solution path; initialize $\lambda$ to a sufficiently large number, which forces B to a zero matrix, and then gradually decreases $\lambda$ in each learning iteration. For a new $\lambda$, the initial value of B is the estimated B learned from the previous $\lambda$, so the initial value of B is not far from the optimal value, and the algorithm will converge within a few iterations. Firstly, $\lambda_{max}$, the smallest tuning parameter value which forces B to a zero matrix, needs to be calculated.

Figure 8:
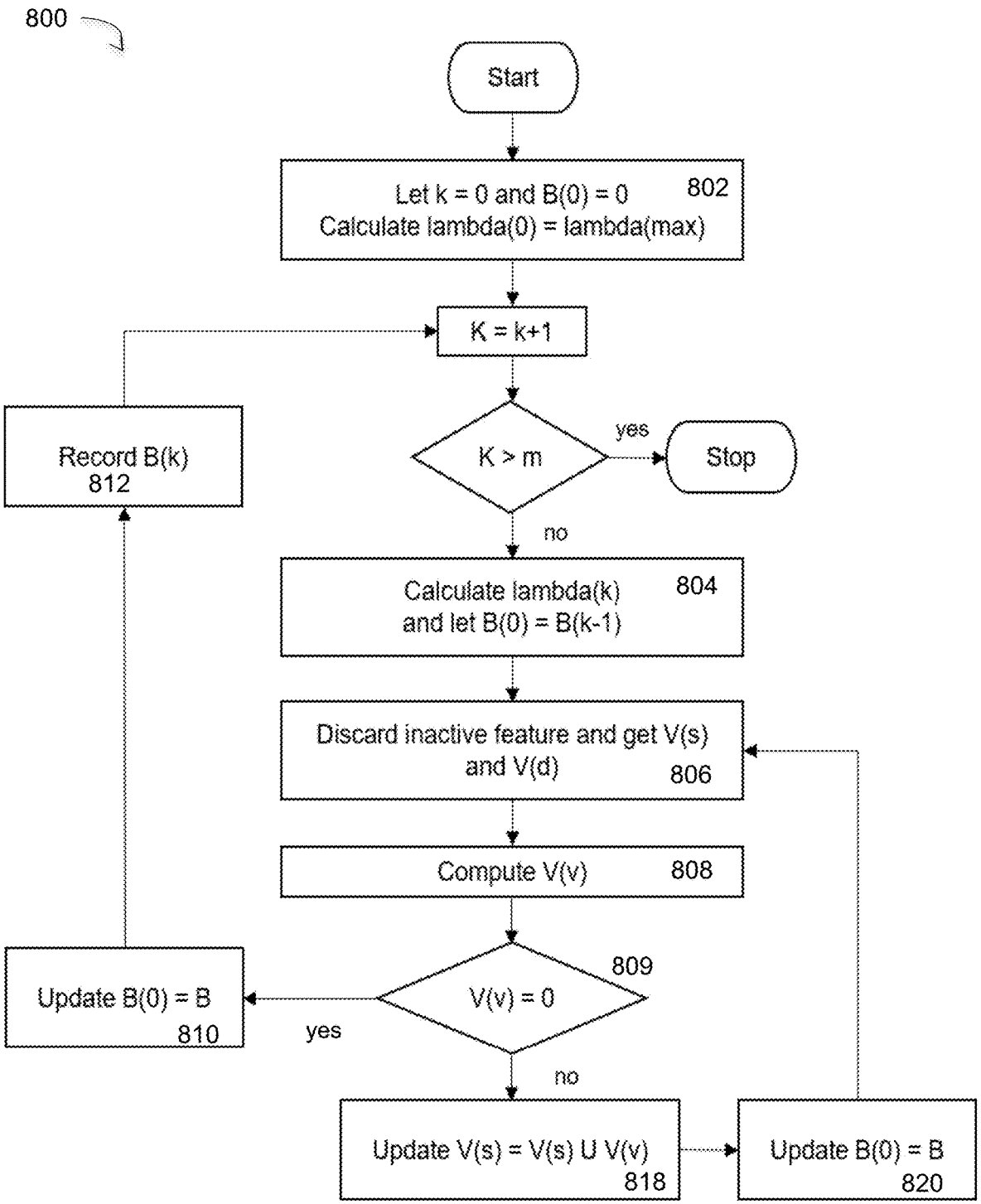
FIG. 8 is a flowchart that illustrates operation of the analytics engine of FIG. 2, under some embodiments.

FIG. 8 is a flowchart that illustrates operation of the analytics engine 206 of FIG. 2, under some embodiments. In an overall method, process 800 starts with setting initial values of 0 for the variables k and B(0), step 802. The k value is incremented (to generate K) and compared to a value, m, and while K is less than m, the process calculates $\lambda(k)$, step 804. The inactive feature is discarded to get V(s) and V(d), step 806, and the value of V(v) is computed, step 808. It is then determined whether V(v) equals 0, step 809. If so, B(0) is updated to B, step 810, and the B(k) value is recorded (step 812) before the process continues with an incremented k value. If, in step 809, V(v) is not determined to be 0, the V(s) value is updated to be the union of V(s) and V(v), step 818, and the value of B(0) is updated to B, step 820. Specific processing steps and variable definition will be provided in greater detail in the description below.

With respect to specific processes for the method of FIG. 8, the failure time is denoted $F_i$ and normal time is denoted $N_i$. For right-censored data in the context of disk reliability: when disks are removed before they actually fail, the relationship is expressed as:

$$y_i = \min(F_i, N_i).$$

The survival data is $(X_i, T_i, \delta_j)$, where:

$X_i$ is (1×p) feature vector, and p is the number of parameters.

$T_i$ is the observed time $\delta_i$ is censoring indicator

If $\delta_i = 1$: Uncensored and $T_i = F_i$

If $\delta_i = 0$: Censored and $T_i = N_i$

The goal is to find the relationship (hazard function) between $(X_i, F_i)$ using a Cox Model: $h(t, X_i) = h_o(t)\exp(X_i\beta)$, where $h_o(t)$ is baseline hazard and $\beta$ is (p×1) regression Coefficient vector. $X_i$ can be formulated as:

$$P_r(X_i \mid F_i) = \frac{h(F_i, X_i)\Delta t}{\sum_{j \in R_i} h(F_i, X_i)\Delta t} = \frac{\exp(X_i\,\beta)}{\sum_{j \in R_i} \exp(X_j\,\beta)}$$

In the above equation, $R_i$ is the risk set at $F_i$ (failure time—for all instances whose failure time are equal to greater than $F_i$). $\beta$ can be learned by maximizing the partial likelihood:

$$l(\beta) = \prod_{i=1}^{k} \frac{\exp(X_i\,\beta)}{\sum_{j \in R_i} \exp(X_i\,\beta)}$$

Embodiments of the analytics engine use transfer learning process, as has been used in classification and regression. A survival transfer learning is used for censored regression. The method employs its loss function for both source and target task.

The above equation will fail to handle tied-failure, which is when two or more failures occur at the same time. Accordingly, embodiments will use Breslow approximation for handling a tied-failure. So the earlier partial likelihood can be formulated as:

$$l(\beta) = \prod_{i=1}^{k} \frac{\exp(\Sigma_{j \in D_i} X_i \; \beta)}{[\Sigma_{j \in R_i} \exp(X_i \; \beta)]^{d_i}}$$

where $D_i$ contains all instances whose failure time is $F_i$ and $d_i = |D_i|$ (size of $d_i$). So, the coefficient vector can be learned via minimizing the negative log-partial likelihood, as follows:

$$l(\beta) = -\sum_{i=1}^{k} \Sigma_{j \in R_i} \; X_j \beta - d_i \; \log[\Sigma_{j \in R_i} \exp(X_j \; \beta)]$$

With respect to feature selection, to find good features, the model learns a shared representation across source and target tasks.

For a transfer learning model: Transfer—Cox can be learned via solving the following minimization problem.

$$\min_B \sum_{t \in \{S,T\}} -\frac{w_t}{N_t} l(\beta_t) + \frac{\mu}{2} \|B\|_F^2 + \lambda \|B\|_{2,1}$$

In the above equation:
S is task in Source domain and T is task in Target domain
$N_t$—Number of instances in target domain
$N_s$—Number of instances in source domain
$B = (\beta_s, \beta_t)$ The model must be trained based on series of values of $\lambda$. This process starts by selecting the best value of $\lambda$ using cross-validation. A warm-start for the 'solution path' is then performed. This is because hyper-parameter tuning is required whenever a Machine Learning model is trained on a new data-set. Some prior information about the overall shape of the function or its type is helpful, as the recommendations could have been better earlier in the process.

In an embodiment, the process initializes $\lambda$ to large value (numerical). This will force B to be zero-matrix. It then gradually decreases $\lambda$ in each learning iteration. For a new $\lambda$ value, the initial value of B is estimated 'B' learned from previous $\lambda$. So, the initial value of B is not far from the optimal value and algorithm will converge within few iterations. The $\lambda_{max}$ (smallest tuning parameter value) forces B to be a zero-matrix and the first value of $\lambda$ as follows:

$\lambda_{max} = \max_j \|\dot{g}(\theta)_j\|_2$

In the above equation:
$\dot{g}(.)_j$ is the $j^{th}$ row of $\dot{g}(.)$
If $\min(N_s, N_t) \geq p$ we set $\lambda_{min} = 0.0001 \lambda_{max}$
Else $\lambda_{min} = 0.05 \lambda_{max}$
The process searches m different $\lambda$ values in total and for the $k^{th}$ step:

$$\lambda_k = \lambda_{max} \left(\frac{\lambda_{min}}{\lambda_{max}}\right)^{\frac{k}{n}}$$

With respect to variable screening, the process identifies features whose corresponding coefficients are guaranteed to be zero (and these will be rejected), as stated in the following equation:

$$\min_B \; g(B) + \lambda \sum_{j=1}^{p} \|B_j\|_2$$

This belongs to Lasso-type problems, Karush-Kuhn-Tucker (KKT) condition. A strong rule (i.e., method to discard inactive features) for this type of problem (Tibshirani) is:

$\dot{g}(\hat{B}_j) = \lambda \theta_j$ for $j = 1, 2, \ldots, p$ where $(\hat{B})$ is the optimal solution and $\theta_j$ is sub-gradient $\|\hat{B}_j\|_2$ which satisfies $\|\theta_j\|_2 \leq 1$ and $\|\theta_j\|_2 < 1$ implies $(\hat{B}_j) = 0$. Based on KKT condition we can discard the inactive features as follows (as corresponding coefficients are negative). Given a sequence of parameter values $\lambda_{min} = \lambda_0 > \lambda_1 > \ldots > \lambda_m$ and suppose the optimal solution $\hat{B}(k-1)$ at $\lambda_{k-1}$ is known. For any $k = 1, 2, \ldots, m$ the $j^{th}$ feature will be discarded if:

$\|(\dot{g}(\hat{B}(k-1))_j\|_2 < 2\lambda_k - \lambda_{k-1}$ and the corresponding coefficient $(\hat{B}(k))_j$ will be set to 0.

But the above method may discard the 'active' features. So, the process checks the KKT condition for only 'discarded' features, where:
$V^d$—index set of discarded features
$V^s$—index set of selected features
If the following condition is satisfied, then $\hat{B}(k)$ is the optimal solution at $\lambda_k$:

$\|\dot{g}(\hat{B}(k-1))_j\|_2 \leq \lambda_k \forall j \in V^d$

Otherwise, it will update $V^S$ as $V^S = V^S \cup V^v$, where $V^v$ is the index of mis-classified features and it is calculated as:

$V^v = \{j | j \in V^d, \|g(\widetilde{B(k)})_j\|_2 > \lambda_k\}$

The R Square values returned by Cox survival analyses are 'pseudo-R square' because they are not necessarily the same as the R Square values returned in ordinary linear regression. The concordance index or C-index is used as one of the performance metrics for any survival analysis problem statement and is a generalization of the area under the ROC curve (AUC) that can take into account censored data. It represents the global assessment of the model discrimination power, which is the model's ability to correctly provide a reliable ranking of the survival times based on the individual risk scores. For example, C-index=1 corresponds to the best model prediction, and C-index=0.5 represents a random prediction.

Figure 9:
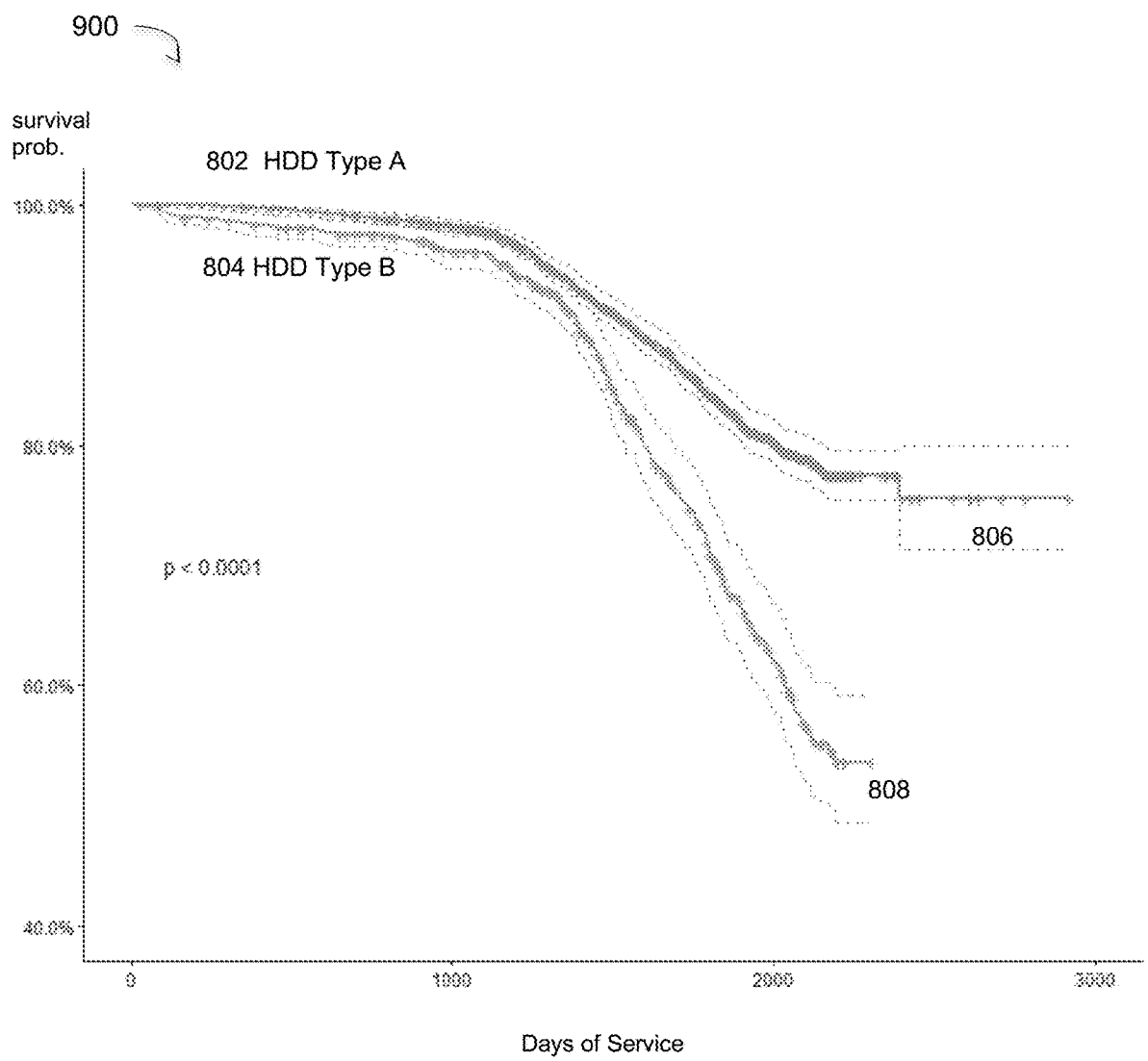
FIG. 9 is a graph showing example graphical output of survival analysis for two different disk models based on transfer learning, under some embodiments.

For the embodiment of FIG. 6, as a final step, process 600 provides a survival forecast for a target disk or disks, 608. The survival forecast could be expressed as the date (or other time measure) at which a drive or drives are expected to fail, or a number of days after which a disk or disks will fail (e.g., "disk 2 will fail after 150 days). This can be provided in the form of any appropriate output such as a report, graphical representation or any other visual representation. FIG. 9 is a graph showing graphical output of survival analysis for two different disk models based on transfer learning, under an example embodiment. Plot 900 of FIG. 9 shows the survival probability over a range of 40% to 100% survival over a number of days of service (e.g., 3000) for two types of HDD drives denoted Type A and Type B. The plot 802 and 804 for each drive is compiled for many data points for each type and show that as the number of days of service increases, the probability of survival drops, or conversely, the chance of failure increases. The flat point of each curve 806 or 808 indicates the number of days after which a drive of that type will fail. Thus, as shown for plot 802, a Type A drive will fail after about 2400 days, and as shown for plot 804, a Type B drive will fail after only about 2200 days.

Figure 10:
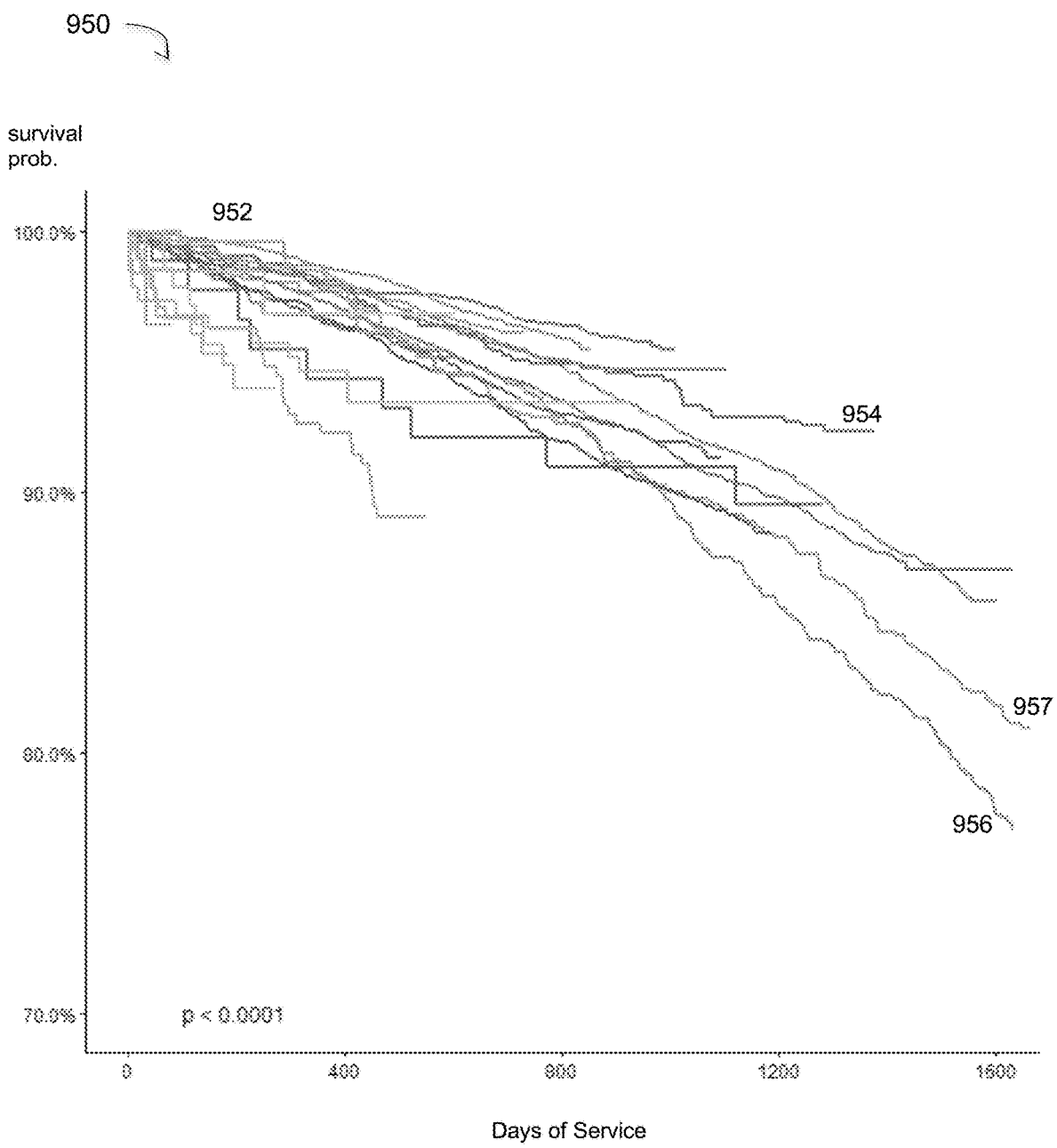
FIG. 10 is a graph showing an example graphical output of survival analysis for a single disk on a quarterly basis, under an example embodiment.

The graphical analysis example of FIG. 9 can be extended or modified to illustrate probability of survival in many different ways. For example, FIG. 10 is a graph showing graphical output of survival analysis for a single disk on a quarterly basis, under an example embodiment. Similar to plot 900 of FIG. 9, plot 950 of FIG. 10 shows the survival probability over a range of 70% to 100% survival over a number of days of service (e.g., 1600), but for only one type of HDD drive. For the example of FIG. 10, a number of different plots 952 are shown, each representing data taken over a different quarter or other appropriate time period (e.g., month, half-year, year, and so on). The point at which a particular curve flattens (e.g., portion 954) indicates the day in which the drive fails. Thus, for the example of FIG. 10, some drives of this type failed at around 600 days, while others (e.g., for plots 956 and 957) survived past 1600 days.

Embodiments of process 120 thus provide transfer learning based on semi-parametric survival analysis for disk drives with different manufacturers and uses auxiliary data to augment learning even when there is insufficient amount of training examples. The process extracts useful knowledge from the source domain and transfers it to the target domain, thus potentially improving the prediction performance in such time-to-event data. It also accelerates computation time using a screening approach for the variable selection and extends the strong rule to sparse survival analysis models in multiple high-dimensional, censored datasets. Unlike previous batch model based analysis, embodiments of process 120 are scalable, and the time taken to obtain the results is linear with respect to both the number of instances and features.

The use of semi-parametric transfer learning provides a great advantage over previous threshold based failure detection methods, which provide only a fail/survive status with respect to fixed threshold values. The use of censored data as well as non-censored data ensures that events of interest that may not be observed during periods of interest are considered rather than ignored or discounted. The safe screening method, which reduces feature dimensions is able to efficiently identify features whose corresponding coefficients are guaranteed to be zero, and scalability in high dimensions means that it is able to identify features whose corresponding coefficients are guaranteed to be zero. This is particularly advantageous over present systems where feature selection is based on statistical and machine learning methods. The use of hybrid parameters based on both SMART and operating system parameters provides many additional data points over prediction systems that use only SMART parameters for disk failures.

As shown in FIG. 1, process 120 can be provided as part of a server-side process or as a cloud (or other network) based process or component, as such it can be used as an embedded cloud component to provide real-time failure analysis for cloud-based storage devices and resources.

Although embodiments are described with respect to hard disk drives, they can also be used for other types of drives, such as solid state drives, multi-media card (MMC) storage devices, and the like. For example, for SSD failure detection, the selected variables can be ranked and then selected (e.g., first N variables) to create a set of variables that are common in all the models). An SSD disk drive which may show a sign of failure in next N days can then be displayed on a visual dashboard and an alert might be send to user.

In a large-scale backup environment, such as a Dell EMC Data Domain network, disk health of the Data Domain system can be tracked from system logs and an internal time-series database may be created. This database can be an input to the model for forecasting disk failure. Future disk failure on existing Data Domain system disk groups can be ranked in a descending order as per the confidence of forecast and decision can be made as per credibility measure.

Embodiments can also be used to model component failures. For example method 120 is a use case of binary classification, but it can be extended to various components failures like CPU, batteries and the network itself. A dataset for each component can be created and analysed, and then fed to the model for forecasting potential failure events or conditions.

System Implementation

Figure 11:
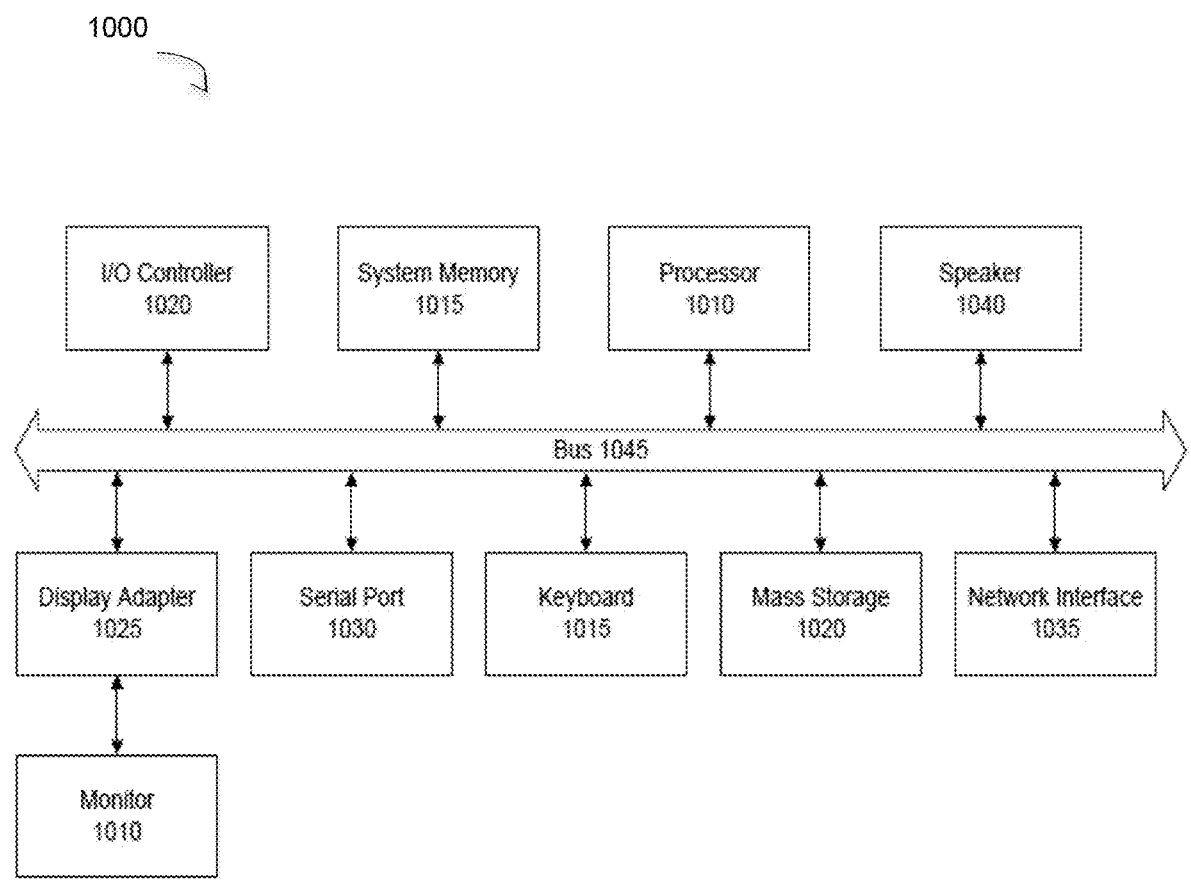
FIG. 11 is a block diagram of a computer system used to execute one or more software components of a disk drive failure forecasting process, under some embodiments.

As described above, in an embodiment, system 100 includes a disk drive failure forecasting process 120 that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein. FIG. 11 is a block diagram of a computer system used to execute one or more software components of the described process, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 11 is an example of a computer system suitable for use with the present system. Other configurations of subsystems suitable for use with the present invention will be readily apparent to one of ordinary skill in the art.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word:

any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of forecasting a survival period in a data storage network executing a data backup process transferring data for storage in a plurality of disk drives, comprising:
    defining a dataset to be transferred from a source to the disk drives through the data backup process, wherein the disk drives comprise a high capacity disk drive array;
    creating a model that combines uncensored data and censored data;
    obtaining operating system data and manufacturer data for the disk drives to create the dataset, the operating system data comprising machine-generated data from the data storage network and including operational log data of the data backup process and automatically populated into a database table;
    screening the dataset to identify a number of features to be selected for the model creation, wherein the screening step identifies features whose corresponding coefficients are guaranteed to be zero based on a Karush-Kuhn-Tucker (KKT) condition to eliminate unimportant features from the dataset; and
    performing, in an analytics engine executing one or more computer-implemented artificial intelligence processes, semi-parametric survival analysis on the data set using transfer learning on the model to provide a time-based failure prediction of the disk drives to ensure proper execution of data transfers of the data backup process.

2. The method of claim 1 further comprising providing to a user the failure prediction through a graphical user interface in one of text form or graphical form.

3. The method of claim 1 wherein the high capacity disk drive array comprises a RAID array on the order of several multi-terabyte capacity disks, and wherein network comprises at least part of a SCSI network, and wherein the disk drive comprises one of a set of hard disk drives (HDD) or solid state drives (SDD) coupled to a backup server over the network.

4. The method of claim 1 wherein the censored data comprises data points for disk drives which are removed from observation before an actual failure, and the uncensored data points are data points that are kept in observation until end-of-life of a disk drive.

5. The method of claim 4 wherein the operating system data comprises certain SCSI sense code providing operating system parameters provided to the analytics engine.

6. The method of claim 4 wherein the manufacturer data comprises SMART (Self-Monitoring, Analysis and Reporting Technology) data of the disk drives provided to the analytics engine.

7. The method of claim 1 further comprising obtaining the operating system data and manufacturer data by:
    generating a training dataset in a backup source domain;
    generating a training dataset in a backup target domain; and
    generating a testing dataset in the backup target domain.

8. The method of claim 7 wherein the dataset comprises, for a plurality of time instances:
    a survival time for each feature of the number of features selected for the model, wherein the survival time is the time until the disks were powered on; and
    a censor indicator denoting a status of the disk drive with a first binary value indicating a failed state and a second binary value indicating a normal state.

9. The method of claim 8 wherein the semi-parametric survival analysis comprises using a Cox model to estimate a risk of failure of the disk drives based on the selected operating system and SMART parameters.

10. A system for forecasting a survival period in a data storage network, comprising:
    a data backup server executing a data backup process defining a dataset to be transferred from a source to a plurality of disk drives provided as a high capacity disk drive array;
    a model created by combining uncensored data and censored data;
    an interface obtaining operating system data and manufacturer data for the disk drives to create the dataset, the operating system data comprising machine-generated data from the data storage network and including operational log data of the data backup process and automatically populated into a database table;
    a screening component screening the dataset to identify a number of features to be selected for model creation, wherein the screening component identifies features whose corresponding coefficients are guaranteed to be zero based on a Karush-Kuhn-Tucker (KKT) condition to eliminate unimportant features from the dataset; and
    an analytics engine executing one or more computer-implemented artificial intelligence processes, semi-parametric survival analysis on the data set using transfer learning on the model to provide a time-based failure prediction of the disk drives to ensure proper execution of data transfers of the data backup process.

11. The system of claim 10 further comprising a graphical user interface providing to a user the failure prediction in one of text form or graphical form.

12. The system of claim 10 wherein the high capacity disk drive array comprises a RAID array on the order of several multi-terabyte capacity disks, and wherein network comprises at least part of a SCSI network, and wherein the disk drive comprises one of a set of hard disk drives (HDD) or solid state drives (SDD) coupled to a backup server over the network.

13. The system of claim 10 wherein the censored data comprises data points for disk drives which are removed from observation before an actual failure, and the uncensored data points are data points that are kept in observation until end-of-life of a disk drive.

14. The system of claim 10 wherein the operating system data comprises certain SCSI sense code providing operating system parameters provided to the analytics engine.

15. The system of claim 14 wherein the manufacturer data comprises SMART (Self-Monitoring, Analysis and Reporting Technology) data of the disk drives provided to the analytics engine.

16. The system of claim 10 further comprising a data processing component obtaining the operating system data and manufacturer data by:
    generating a training dataset in a backup source domain;

generating a training dataset in a backup target domain; and generating a testing dataset in the backup target domain.

17. The system of claim 16 wherein the dataset comprises, for a plurality of time instances:

a survival time for each feature of the number of features selected for the model, wherein the survival time is the time until the disk drives were powered on; and a censor indicator denoting a status of the disk drives with a first binary value indicating a failed state and a second binary value indicating a normal state.

18. The system of claim 17 wherein the semi-parametric survival analysis comprises using a Cox model to estimate a risk of failure of the disk drives based on the selected operating system and SMART parameters.

19. A computer program product, comprising a non-transitory computer-readable medium having a computer-readable program code embodied therein, the computer-readable program code adapted to be executed by one or more processors to implement a method of forecasting a survival period in a data storage network executing a data backup process transferring data for storage in a plurality of disk drives, by:

storage in a plurality of disk drives, comprising:

defining a dataset to be transferred from a source to the disk drives through the data backup process, wherein the disk drives comprise a high capacity disk drive array;

creating a model that combines uncensored data and censored data;

obtaining operating system data and manufacturer data for the disk drives to create the dataset, the operating system data comprising machine-generated data from the data storage network and including operational log data of the data backup process and automatically populated into a database table;

screening the dataset to identify a number of features to be selected for the model creation, wherein the screening step identifies features whose corresponding coefficients are guaranteed to be zero based on a Karush-Kuhn-Tucker (KKT) condition to eliminate unimportant features from the dataset; and performing, in an analytics engine executing one or more computer-implemented artificial intelligence processes, semi-parametric survival analysis on the data set using transfer learning on the model to provide a time-based failure prediction of the disk drives to ensure proper execution of data transfers of the data backup process.

20. The computer program product of claim 19 further comprising instructions to provide to a user, the failure prediction through a graphical user interface in one of text form or graphical form.

* * * * *